July 22, 1924.

R. E. FIELDER

MOTOR VEHICLE

Filed June 17, 1922 4 Sheets-Sheet 2

1,502,026

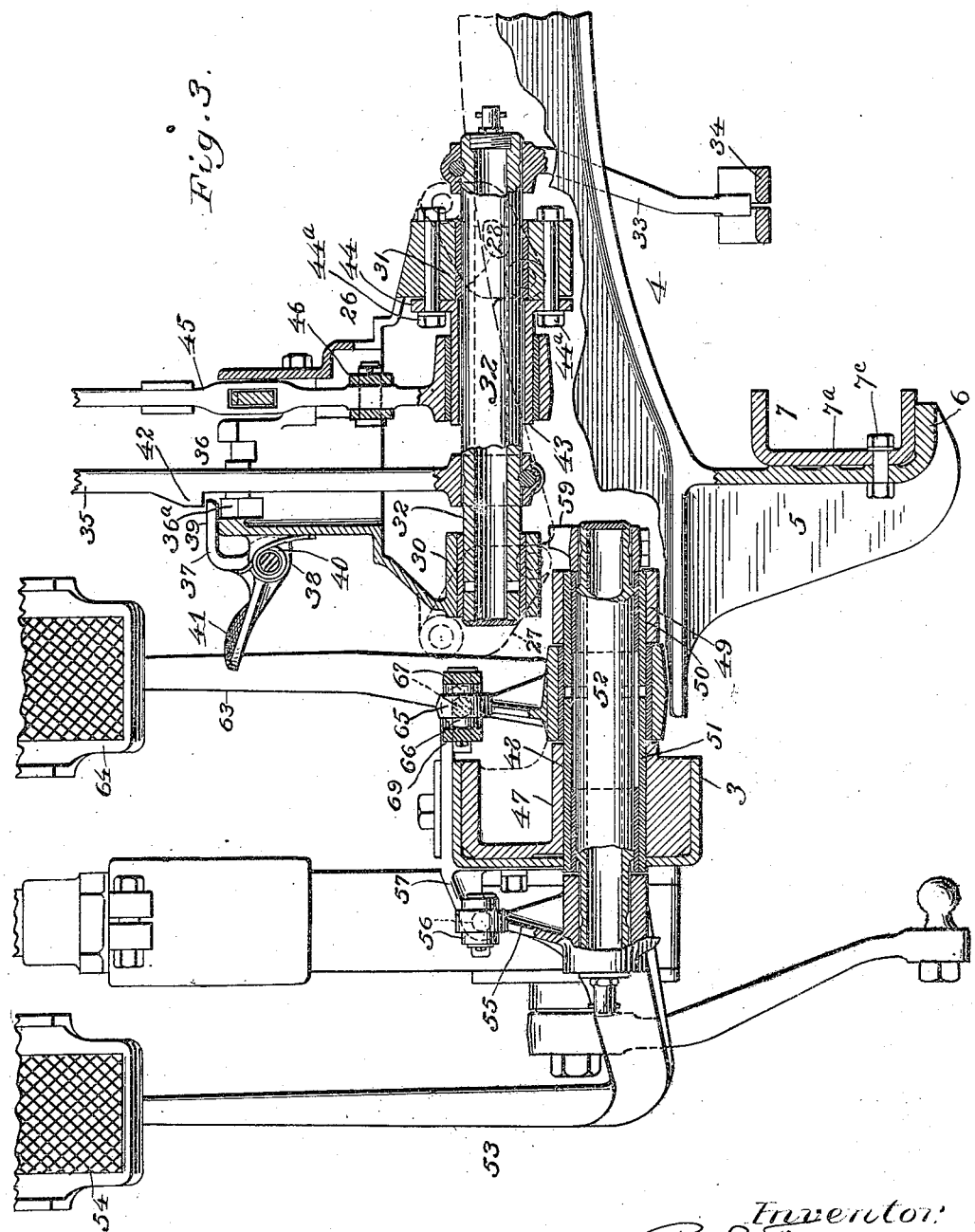

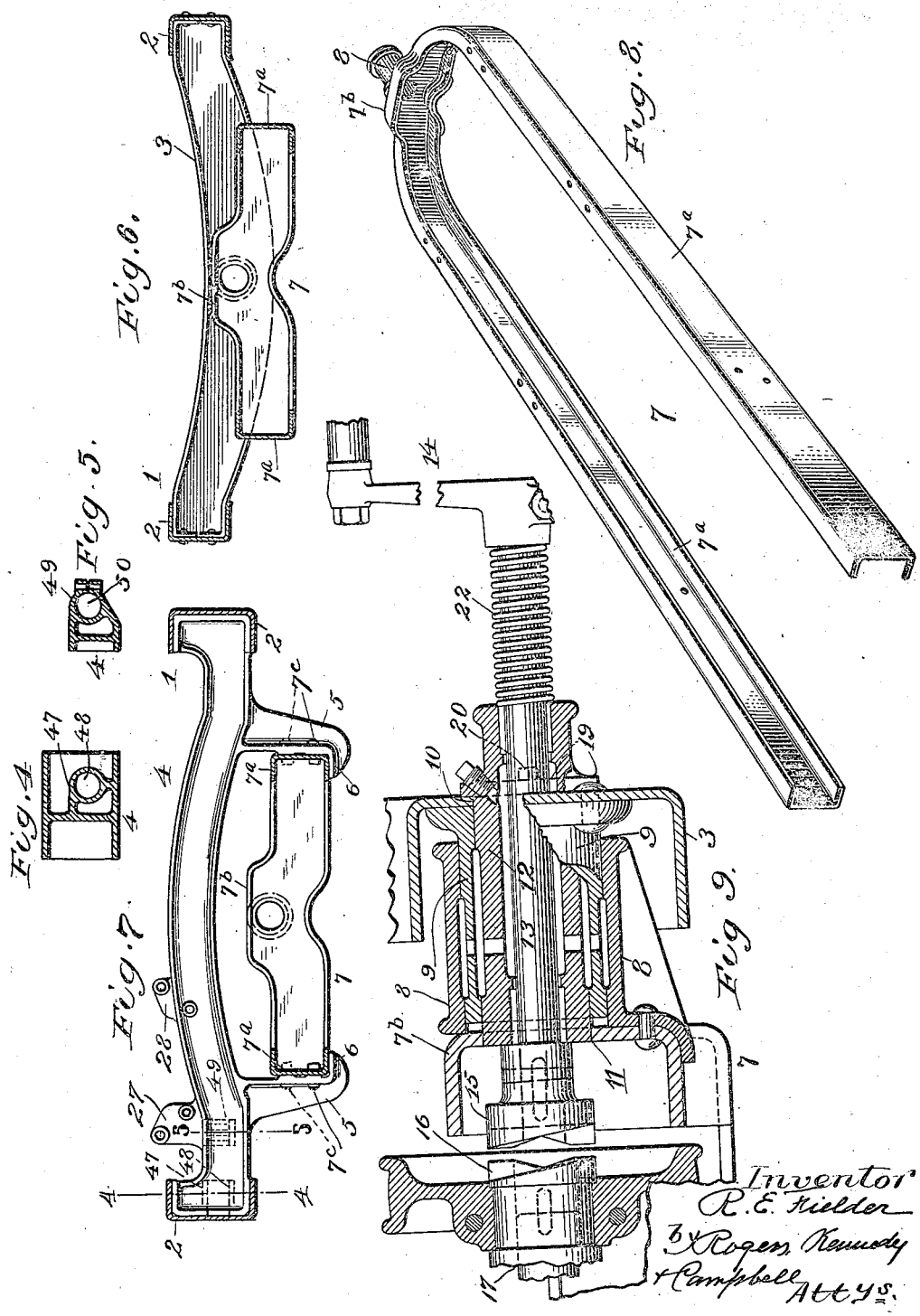

Patented July 22, 1924.

1,502,026

UNITED STATES PATENT OFFICE.

REUBEN E. FIELDER, OF NEW YORK, N. Y.

MOTOR VEHICLE.

Application filed June 17, 1922. Serial No. 569,122.

*To all whom it may concern:*

Be it known that I, REUBEN E. FIELDER, a citizen of the United States, residing at New York, in the county of New York and State of New York, have invented certain new and useful Improvements in Motor Vehicles, of which the following is a specification, reference being had therein to the accompanying drawing.

This invention relates to motor vehicles and the invention consists in certain improvements in the manner of attachment of the motor-sustaining sub-frame to the chassis frame; in the manner of mounting the gear-shift control box on the chassis frame and the support of the gear-shift shaft by the control box to enable the box and parts supported by it to be removed from the chassis frame as a unit; in the mounting of the brake and clutch pedal levers on the chassis frame; and in other details of the construction and arrangement of the parts, which will be fully described in the specification to follow, and the novel features thereof set forth in the appended claims.

In the accompanying drawings:

Fig. 3 is a transverse sectional elevation on an enlarged scale on the line 3—3 of Fig. 1, as viewed in the direction of the arrow on said line.

Fig. 4 is a sectional elevation on the line 4—4 of Fig. 7.

Fig. 5 is a similar view on the line 5—5 of Fig. 7.

Fig. 6 is a transverse sectional elevation on the line 6—6 of Fig. 1.

Fig. 7 is a transverse sectional elevation on the line 7—7 of Fig. 1.

Fig. 8 is a perspective view of the sub-frame detached.

Fig. 9 is a longitudinal sectional elevation on the line 9—9 of Fig. 1 to show how the subframe is supported at its front by the chassis frame.

Figure 1:
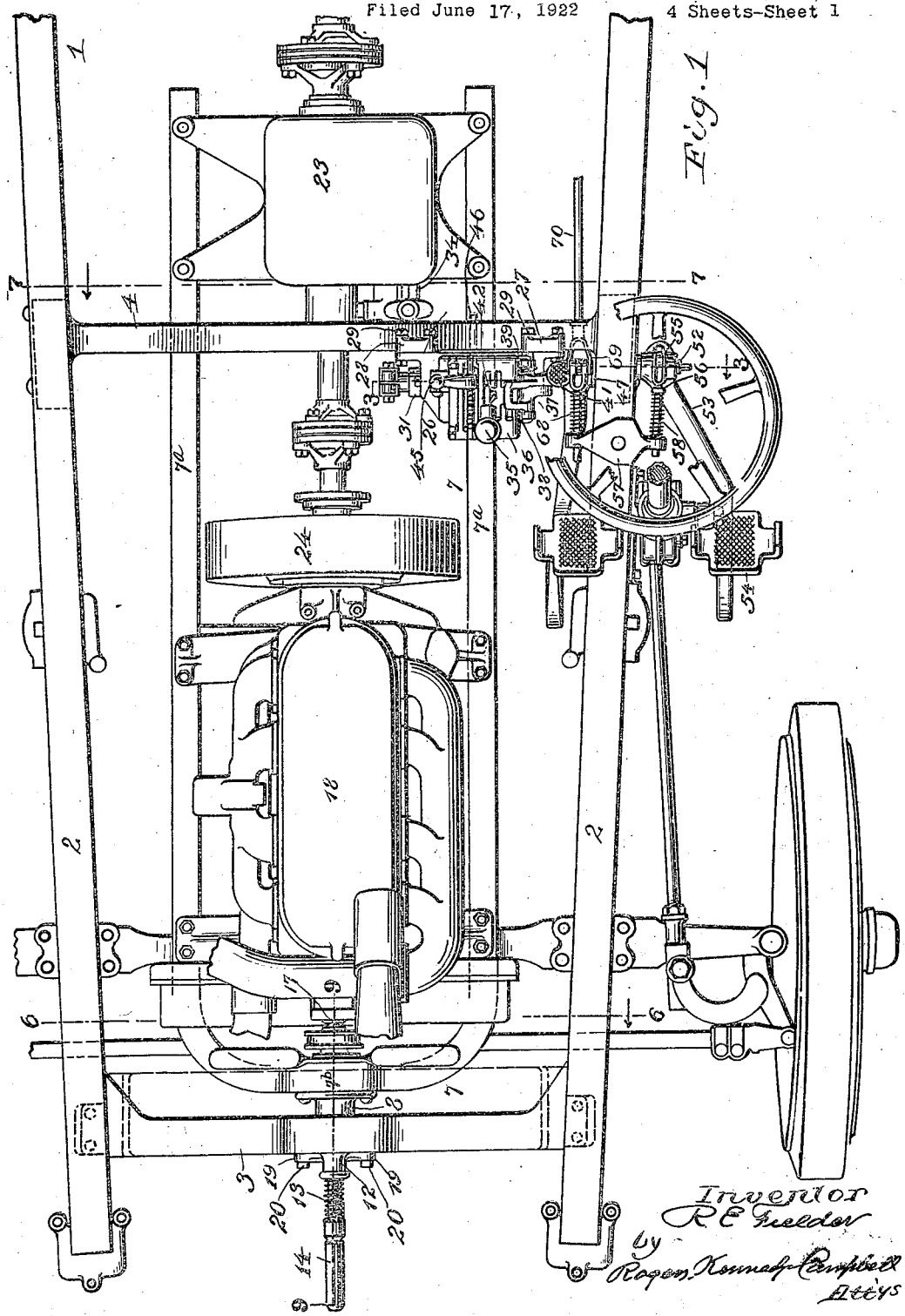
Fig. 1 is a top plan view of the forward end of the chassis frame of a motor vehicle and the parts supported thereby, the same being constructed in accordance with my invention.

Referring to the drawings:

1 designates the forward portion of a chassis frame of a motor vehicle, comprising the two fore-and-aft extending frame bars 2, which in the present instance are formed of channeled bars and are arranged with the channels facing inwardly, the said bars at their forward extremities being adapted to be connected as usual with the vehicle springs. Near their forward ends the bars are connected together in spaced relation by means of a front transverse cross-member 3 of channel iron which has its ends seated in the channels of the frame bars 2 and firmly riveted thereto, and is disposed with its channel facing rearwardly. In rear of this cross-member, the frame bars are connected together and maintained in spaced relation by means of a second transverse cross-member 4, in the present instance in the form of a casting with upper and lower flanges and a central connecting web, the ends of the member being seated in the channels of the frame bars and firmly fastened thereto by suitable fastening devices. On its underside the cross-member 4 has depending from it, two bracket arms 5 formed on their lower ends with inwardly extending supporting lugs or feet 6 for giving support to a motor-supporting sub-frame 7 best shown in Figs. 1, 3 and 8. In the present instance this sub-frame is made of channel iron and is of general U form, comprising two side bars 7ª joined together at their forward ends by a cross limb 7ᵇ, and constituting an integral unitary channeled structure, with the channels on the inside. Near its rear end the sub-frame is supported by the cross-member 4 through the medium of the two supporting lugs 6 on which the side bars 7ª respectively seat and are bolted to the bracket arms by bolts 7ᶜ as shown in Fig. 3. At the front, the sub-frame is supported by the front transverse cross-member 3 as shown in detail in Fig. 9. Here it will be seen that there is fastened to the forward side of the cross limb 7ᵇ of the sub-frame, a forwardly extending hollow neck 8 which is adapted to slip over and be supported by a hollow boss 9 fastened at its forward end to the rear side of the cross-member 3 in the channel thereof, and surrounding a central circular opening 10 in the cross-member. The fit of the boss over the neck, while snug, is not a tight fit, so that the sub-frame is permitted some degree of movement relative to the chassis frame in a fore-and-aft direction and also about a fore-and-aft axis, whereby the parts are given a certain amount of desired flexibility in their connection with each other, which prevents any distortion of the chassis frame from being transmitted to the sub-frame. A circular opening 11 is formed in the cross limb 7<sup>b</sup>, which, with the parts assembled as shown, is in axial alignment with the opening 10, and a sleeve 12 is fastened to the cross-member 3 and extends rearwardly through the opening 10 and within the boss 9, and is seated at its rear end loosely in the circular opening 11, the connection of the sleeve with the cross-member being a detachable one for the purpose presently to be described.

The fixed sleeve 12 gives bearing support to a starting shaft 13 extending at its front beyond the front end of the sleeve and provided with a hand crank 14, and extending at its rear end beyond the rear end of the sleeve and having fixed to its extremity a clutch head 15, adapted, when the crank is thrust inwardly, to engage as usual a clutch member 16 on the motor shaft 17 of a motor 18 supported on the sub-frame. The sleeve 12, at a point forward of the cross-member 3, is provided with oppositely extending bracket plates 19 which seat against the forward side of the cross-member and are fastened thereto by removable fastening bolts 20, so that the sleeve and contained shaft, together with the clutch head on the shaft, may be removed as a unit endwise in a forward direction from the parts sustaining them, the diameter of the clutch head being slightly less than the diameter of the openings 10 and 11 in order to permit such removal. The forward end of the clutch head abuts against the rear end of the sleeve 12, and a spring 22 surrounds the shaft and bears respectively against the forward end of the sleeve and the hand crank, whereby the shaft is confined in the sleeve and may be thrust rearwardly as described to engage the clutch members.

In rear of the motor, the sub-frame gives support to the casing 23 enclosing the transmission mechanism, and the motor shaft is provided with the usual fly wheel 24 and clutch (not shown) and extends rearwardly and is operatively connected to the transmission.

The control box, designated by the reference numeral 26, is attached to the forward side of the cross-member 4 at its left hand end as viewed in Fig. 3, and for this purpose the upper flange of the cross-member has cast thereon an outer lug 27 and an inner lug 28 provided with holes to receive fastening bolts 29 engaging the box, and thus firmly fastening the same to the lugs. At its opposite sides the control box is provided with hollow aligned bosses 30 and 31 in which a hollow gear shift shaft 32 is mounted so that it may be rocked and also shifted endwise. At one end the shaft extends beyond the boss 31 and has fixed to its projecting end a downwardly extending arm 33 which is pivoted to the forward end of shift rod 34 extending rearwardly to the transmission mechanism. The shaft 32 is operated by a hand lever 35 which is fixed to the shaft and extends upwardly through the usual change-speed gate 36 in the control box, the lateral movement of the lever in the gate acting to shift the shaft endwise, and the fore-and-aft movement of the lever acting to rock the shaft.

Figure 2:
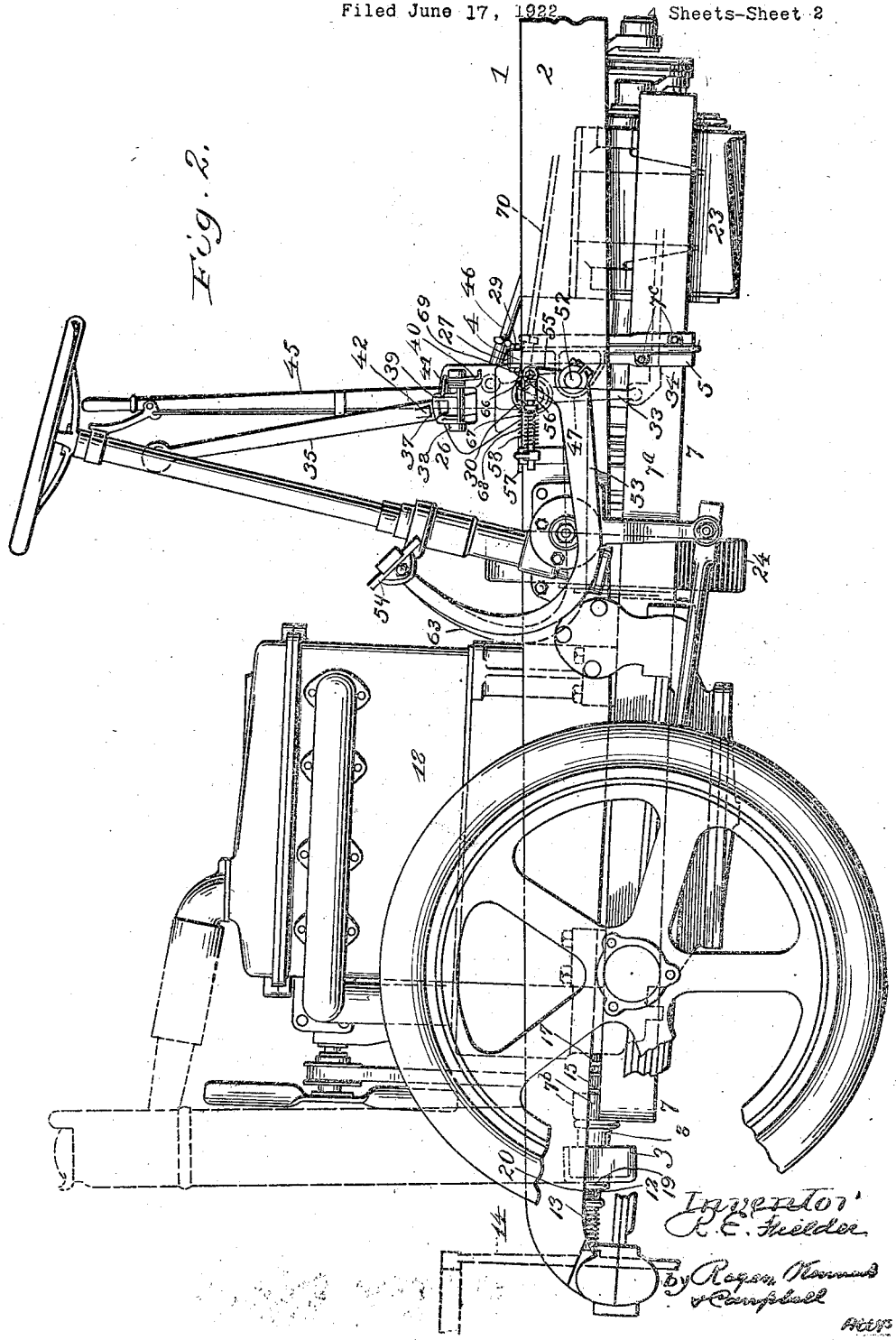
Fig. 2 is a side elevation of the same.

The reverse slot 36<sup>a</sup> of the gate is normally closed against the entrance of the lever therein, in such manner as to require an action of the driver, independently of the operation of the lever, before the lever can be shifted to "reverse." In the present instance this is effected by the provision of a guard member or detent 37, see Figs. 2 and 3, which is pivoted to the side of the control box as at 38 and is provided with a lip 39 adapted to normally extend in an obstructing position over the reverse slot of the gate, a spring 40 acting on the detent and holding it yieldingly in its obstructing position. The detent is provided with a foot pad 41 by which it may be rocked on its pivot by the foot of the driver, and its lip raised from its obstructing position over the slot when the lever is to be shifted to reverse.

In order that the lip of the detent will be prevented from being swung upwardly and thus uncover the reverse slot, in the event that the lever 35 is moved laterally against the edge of the lip before the latter is raised by the foot of the driver, the lever is provided on its side with a lug 42, which when the lever is in a position to engage the edge of the lip, will overhang the same, and will thus prevent it from being swung upwardly by the lateral pressure of the lever.

A collar 43 loosely surrounds the shaft 32 and is provided on its end with ears 44 bolted to the inner side of the boss 31 by the bolts 44<sup>a</sup>. An emergency brake lever 45 is mounted loosely at its end on the collar 43 and extends upwardly through a slot in the control box and has connected with it the forward end of a rod 46 which extends rearwardly and is operatively connected with the emergency brake to operate it.

At its outer extremity the web portion of the cross-member 4 has cast on its forward side, a boss 47 formed with a horizontal transverse circular opening 48, see Fig. 5, and inwardly of this boss a second boss 49 is cast on the web and contains a horizontal circular opening 50 in axial alignment with opening 48. Within these openings a sleeve 51 see Fig. 3 is fixedly mounted, and the inner boss is split and clamped tightly around the sleeve to hold it in place. Mounted to rock in this sleeve is a hollow clutch operating shaft 52 extending at its ends respectively beyond the outer and inner bosses. A clutch pedal 53 is fixed to the outer end of the hollow shaft and extends upwardly and forwardly and is provided on its end with a foot pad 54. At its inner end the pedal has fixed to it an upwardly extending arm 55 which is pivoted to the rear end of a horizontal rod 56 sliding through the outer end of a bracket plate 57 fixed to the frame bar 2. A spiral spring 58 surrounds the rod and bears at its front end against the bracket plate and at its rear end against a shoulder on the rod, and acts to yieldingly hold the clutch pedal raised. An arm 59 is fixed to the inner end of the shaft 52 and is adapted to be operatively connected with the clutch in such manner that when the pedal lever is depressed, the clutch will be disengaged, and when the pedal lever is raised by its spring, the clutch will be engaged again.

Between the two bosses 47 and 49, a brake pedal 63 is mounted to rock on the sleeve 51 and extends forwardly and upwardly and is provided on its end with a foot pad 64. Fixed to the inner end of the brake pedal is an upwardly extending arm 65 through which is passed a horizontal transverse pivot bolt 66. A horizontal rod 67 is forked at its rear end to embrace the end of the arm and is pivoted to the arm by the pivot bolt, and extends forwardly loosely through the inner end of the bracket plate 57 before alluded to. A spiral spring 68 surrounds the rod and bears at its rear end against a shoulder thereon and at its forward end against the bracket plate, and acts to hold the brake lever yieldingly in raised position. A yoke 69 is pivoted to the ends of the pivot bolt and has connected with it the forward end of a rod 70 which extends rearwardly and is connected with the service brake mechanism (not shown) in such manner that on the depression of the brake pedal, the brakes will be applied, and on the release of the pedal it will be raised by its spring and the brakes will be released.

Due to the support of the gear-shift control-box by the cross-member 4 as described, the box and the parts supported thereby may be removed as a unit for replacements or repairs, by first removing the fastening bolts 29 and disconnecting the arm 33 from the shift rod 34, which latter is provided with a spring clamp to clip to the end of the arm.

In the foregoing description and accompanying drawings, I have set forth the invention in the particular detailed form and construction which I prefer to adopt. It will be understood however that the details may be variously changed and modified without departing from the limits of the invention; and further it will be understood that the invention is not limited to any particular form or construction of the parts except in so far as such limitations are specified in the claims.

Having thus described my invention, what I claim is:

1. In a motor vehicle, the combination with a chassis frame provided with a cross member, of a gear shift control box supported by said cross member, a gear shift lever journaled in and supported by said box and extending to the outside of the same, and means operatively connected with said lever and adapted to be connected with the gear shift mechanism for actuating it.

2. In a motor vehicle, the combination with a chassis frame provided with a cross member, of a gear shift control box fixed to the forward side of said cross member near one end thereof, a gear shift lever journaled in and supported by said box and extending to the outside of the same, and means operatively connected with said lever and adapted to be connected with the gear shift mechanism for actuating it.

3. In a motor vehicle, the combination with a chassis frame provided with a cross member having upwardly extending lugs, of a gear shift control box fastened to said lugs, a gear shift lever journaled in and supported by said box and extending to the outside of the same, and means operatively connected with the lever and adapted to be connected with the gear shift mechanism for actuating it.

4. In a motor vehicle, the combination with a chassis frame provided with a cross member, of a gear shift control box detachably connected to said cross member, a gear shift shaft journaled in the box, a shift lever fixed to the shaft and extending to the outside of the box, an arm on the lever, and a shift rod detachably connected with said arm and adapted to be operatively connected with the gear shift mechanism for actuating it.

5. In a motor vehicle, the combination of a chassis frame, a gear shift control box supported thereby, a gear shift shaft journaled in the box and adapted to be operatively connected with the gear shift mechanism for actuating it, a lever on the shaft extending outside the box, an emergency brake lever mounted within the box and rockable about the axis of the gear shift shaft, and means operatively connected with the emergency brake lever and adapted to be connected with the emergency brake mechanism for actuating it.

6. In a motor vehicle, the combination with a chassis frame, of a gear shift control box supported thereby, a gear shift shaft journaled in said box and adapted to be operatively connected with the gear shift mechanism, a shift lever connected with the shaft and extending outside the box, a collar fixed within the box and surrounding the shaft, an emergency brake lever loosely mounted on the collar, and means operatively connected with the last mentioned lever and adapted to be connected with the emergency brake mechanism for actuating it.

7. In a motor vehicle, the combination of a gear shift control box provided with a reverse gate slot, a gear shift lever mounted in the box and movable into the slot, and a detent pivoted on a horizontal fore-and-aft axis to the outer side of the box and provided with a lip normally extending horizontally inwardly over the slot in the path of movement of the lever into the slot, said detent having an outwardly extending foot lever for rocking it to swing the lip out of the path of the lever.

8. In a motor vehicle, the combination of a gear shift control box provided with a reverse gate slot, a gear shift lever movable into the slot, a detent pivoted to the outer side of the box and provided with a lip extending inwardly in a position to cover the slot and movable upwardly by the pivotal movement of the detent to uncover the slot, means for holding the detent with the lip normally covering the slot, and a lug on the side of the lever in position to overlie the lip when the latter is in a position covering the slot.

9. In a motor vehicle, the combination of a gear-shift control-box provided with a reverse gate-slot, a gear-shift lever mounted in the box and movable into said slot, a guard member normally covering said slot in the path of movement of the lever, and movable at will to uncover the slot, and means on the lever in position to prevent the uncovering movement of the guard member when engaged by the lever.

10. In a motor vehicle, the combination with a chassis frame, of a cross-member thereon provided with hollow bosses, a sleeve fixed within said bosses, a clutch operating shaft journaled within the sleeve, a foot pedal fixed to the shaft for operating the clutch, and a second foot pedal loosely mounted on the sleeve for operating the brake.

11. In a motor vehicle, the combination with a chassis frame, a foot pedal journaled thereon, an upwardly extending arm rigidly fixed on the foot pedal, a rod pivoted to the arm, a fixed guide on the chassis frame through which the rod slides, and a spring surrounding the rod and acting on the guide and rod to hold the foot pedal raised.

12. In a motor vehicle, the combination of a chassis frame having side frame bars, of a cross-member connected to and extending between said frame bars, said cross-member being provided with depending arms to support a sub-frame, and being provided also with lugs for the attachment of a gear-shift control-box, and being provided further with hollow bosses for the mounting of clutch and brake pedal levers.

In testimony whereof, I have affixed my signature hereto.

REUBEN E. FIELDER.